May 26, 1936.  P. S. WETMORE  2,041,986
FISH PACK AND METHOD OF PACKING FISH
Filed July 3, 1935
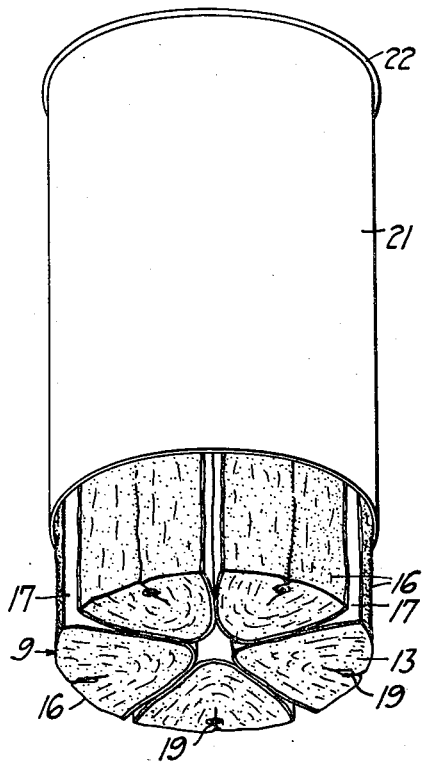
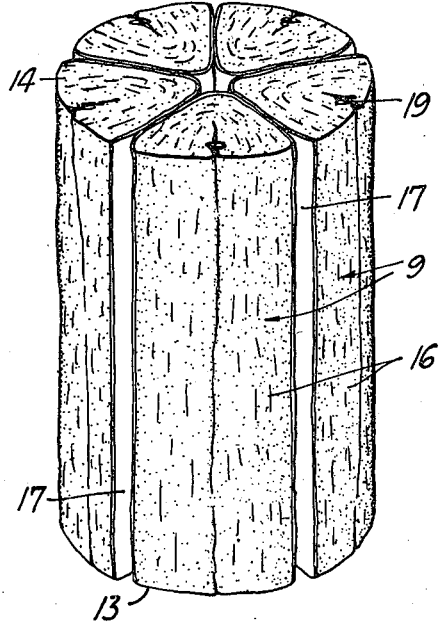
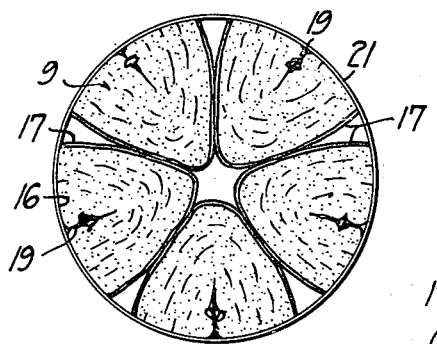
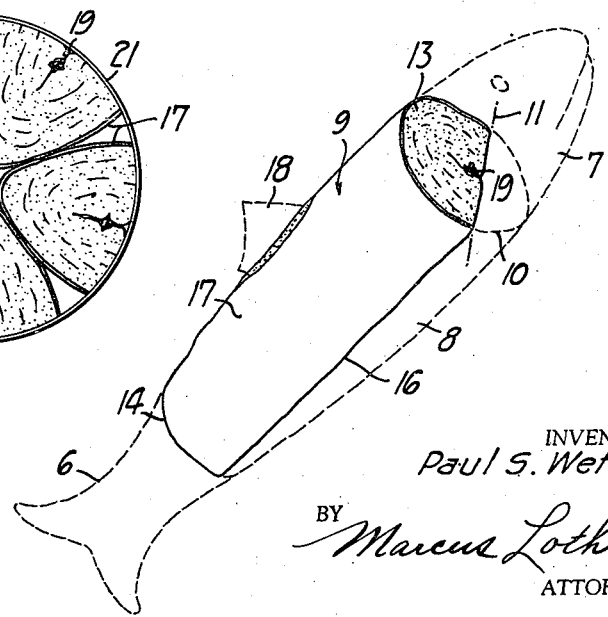
INVENTOR.
Paul S. Wetmore
BY Marcus Lothrop
ATTORNEY.

Patented May 26, 1936

2,041,986

UNITED STATES PATENT OFFICE 2,041,986

FISH PACK AND METHOD OF PACKING FISH

Paul S. Wetmore, Benicia, Calif., assignor to Benicia Fisheries, Benicia, Calif., a corporation of California Application July 3, 1935, Serial No. 29,759

8 Claims. (Cl. 99—188)

My invention relates to a way of putting up for commercial sale fish of the sardine or, more properly speaking, pilchard type which usually range from eight to twelve inches in length. The invention contemplates a fish packing method including the separating of the fish into its edible, desirable portions and its less desirable portions, and the packaging of the desirable portions in a readily usable and attractive fashion.

An object of my invention is to provide a fish pack in which the fish sections are substantially uniform in appearance and size.

Another object of my invention is to provide a fish pack in a standard container, such as a metal can.

A further object of my invention is to provide a fish pack in which the fish can readily be removed from the container for use.

The foregoing and other objects of the invention are attained in the embodiment illustrated in the drawing, in which Fig. 1 is a perspective view of fish being discharged from an opened container in accordance with my invention.

Fig. 2 is a perspective of a fish pack in accordance with my invention, with the container entirely removed.

Fig. 3 is a cross-section transversely through a container packed with fish in accordance with my invention.

Fig. 4 is a view of a fish section showing its relationship to the pilchard from which it is derived.

In its preferred form the fish pack and the method of packing fish of my invention include cutting a fish section from the dorsal portion of a fish such as a pilchard, the portion being generally rectangular in side elevation and semielliptical in end elevation, removing the dorsal fin from such section, and placing a plurality of generally identical sections into a circular cylindrical container in such a way that the flesh portion of each section is in contact with the wall of the container and so that the skin portions of all of the sections are arranged in substantial contact and substantially coincident with the longitudinal axis of the container.

A typical fish, such as a pilchard, is disclosed in Fig. 4, the dotted line portions being those parts not utilized in the fish pack of my invention, and the solid line portion being that part which forms what I term a "tenderloin" or "fish section". In the copending application of Alton L. Dunn, Serial No. 24,018, filed May 29, 1935, for "Fish tenderloining machine", there is disclosed a mechanism for holding a pilchard while severing the tail portion 6 and the head portion 7 therefrom by cuts transversely of the fish, and while removing the belly portion 8 to leave a dorsal section 9. In side elevation this section is substantially rectangular, but in end elevation it is semi-elliptical or parabolic being symmetrical about the vertical, central plane of the fish. The end elevation is partially bounded or defined by the general elliptical or parabolic, cross-sectional contour 10 of the body of the fish, and likewise being bounded by a substantially straight, transverse planar cut 11 which is approximately normal or perpendicular to the central plane of the fish.

The machine described in the mentioned Dunn application treats a plurality of fish to provide a succession of fish sections 9, all of which are substantially identical in size and appearance. Each section, when discharged by the machine, is bounded on its opposite, semi-elliptical ends 13 and 14 and on its planar surface 16 by the flesh of the fish, whereas on the remaining surface, such as the curved back 17, the section is covered with the skin of the fish.

In following out the method of my invention, each fish section is preferably treated by hand to remove the dorsal fin 18. This is preferably accomplished by a single knife cut along the back of the fish. Additionally, if necessary, the interior flesh of the fish is scraped down to the back-bone 19, by hand, and the treated section is immersed in a salt brine of about 30% saturation for approximately an hour. The fish sections so treated are then arranged in groups of five and introduced into a circular cylindrical container 21, having a planar circular bottom 22 and a comparable top (not shown) of the usual standard kind.

I have found that in arranging the fish sections in the container it is very important that the flesh surface 16 be placed in contact with the metal wall of the container and that the skins 17 on the sections be placed in mutual contact, so that the fish sections are arranged with their longitudinal dimensions substantially parallel with the central axis of the container. In this fashion the contact between the fish sections and the container, both on the side of the container 21 and on the top and the bottom, is between the fish flesh and the metal of the container, whereas the contact between the fish sections themselves is between the skin of successive sections.

I have found that this arrangement precludes sticking of the individual sections to each other and to the container, for the reason that the skin of the fish, after packing, tends to stick to the metallic surface of the container if it is permitted to come into contact therewith, and that the flesh of successive sections tends to cohere if placed in pressure contact. But in accordance with my invention, when the can or container is opened as indicated in Fig. 1 and is tapped lightly, the entire pack can be deposited in the shape shown in Fig. 2 upon a supporting surface, such as a plate, due to the free disengagement between the individual fish sections and the container. The pack will retain its standing position indefinitely, due to the shape of the sections; nevertheless, it is very simple to withdraw or remove one of the sections from the pack for use without in any other wise disrupting the pack, since the contact between the skin of the fish permits each element readily to move with respect to the next one.

I claim:

1. A fish pack comprising a metal container having a cylindrical wall, and a plurality of fish sections each having a flesh portion and a skin portion arranged in the container with the flesh portions in contact with the wall and the skin portions in mutual contact.

2. A fish pack comprising a container having a circular cylindrical wall, and a plurality of fish sections arranged in the container with the dorsal portions of the sections substantially coincident with the axis of the container and with cut surfaces of the sections in contact with the wall.

3. A fish pack comprising a cylindrical container having a longitudinal axis within which is disposed a plurality of substantially identical elongated fish sections each of which is symmetrical about a central longitudinal plane arranged with said plane for each section passing through said axis.

4. The method of packing fish which comprises cutting from a fish a section which is rectangular in side elevation and semi-elliptical in end elevation, and arranging a plurality of such sections in a circular cylindrical container with the ends of the sections coplanar and the sides of said sections disposed radially of said container.

5. The method of packing fish which comprises cutting from a fish a dorsal section which is approximately rectangular in side elevation and substantially parabolic in end elevation, and arranging a plurality of such sections in a cylindrical container with the dorsal portions of the sections substantially coinciding with the longitudinal axis of the container and with the parabolic sides of adjacent sections tangent to each other.

6. The method of packing fish of the pilchard type in a circular cylindrical metal can, which comprises cutting a dorsal section from the fish, removing the dorsal fin from said section, and arranging a plurality of such sections in the can with the flesh portion of each section contacting the can and the skin portion of the sections in mutual contact.

7. The method of packing fish of the pilchard type in a cylindrical metal can, which comprises excising a dorsal section by a longitudinal cut perpendicular to the plane of symmetry of the fish and by transverse cuts perpendicular to said plane, and arranging a plurality of such sections with all of their cut surfaces in contact with said can and with their uncut surfaces in mutual contact.

8. A fish pack comprising a plurality of identical fish sections, each section being approximately rectangular in side elevation and in end elevation being arranged symmetrically about its respective one of a plurality of central planes radiating from a common axis.

PAUL S. WETMORE.